US011843871B1

(12) United States Patent
Dey et al.

(10) Patent No.: US 11,843,871 B1
(45) Date of Patent: Dec. 12, 2023

(54) SMART HIGH DYNAMIC RANGE IMAGE CLAMPING

(71) Applicant: QUALCOMM Incorporated, San Diego, CA (US)

(72) Inventors: Abhijeet Dey, Bengaluru (IN); Vijayamanohar Nagarajan, Bangalore (IN); Debarati Kundu, Bangalore (IN); Joby Abraham, Bangalore (IN); Aakil Mahendra Bapna, Bangalore (IN); Animesh Behera, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/824,794

(22) Filed: May 25, 2022

(51) Int. Cl.
*H04N 23/741* (2023.01)
*G06T 9/00* (2006.01)
*H04N 23/72* (2023.01)

(52) U.S. Cl.
CPC ............ *H04N 23/741* (2023.01); *G06T 9/00* (2013.01); *H04N 23/72* (2023.01)

(58) Field of Classification Search
CPC ......... H04N 23/741; H04N 23/72; G06T 9/00
See application file for complete search history.

(56) References Cited

U.S. PATENT DOCUMENTS

| 10,467,732 | B2 | 11/2019 | Dewhurst |
| 2020/0336684 | A1* | 10/2020 | Wang .................... H04N 25/134 |
| 2021/0021751 | A1* | 1/2021 | Lee ......................... H04N 1/387 |
| 2021/0243348 | A1 | 8/2021 | Heo |

OTHER PUBLICATIONS

International Search Report and Written Opinion—PCT/US2023/065131—ISA/EPO—dated Jun. 30, 2023.

* cited by examiner

*Primary Examiner* — Ahmed A Berhan
(74) *Attorney, Agent, or Firm* — Polsinelli/Qualcomm

(57) ABSTRACT

Systems and techniques are provided for generating an HDR image. An example method can include obtaining a first image and a second image that has an exposure that is greater than an exposure of the first image; setting pixels of the first image that are below a minimum threshold to a minimum value and pixels of the second image that are above a maximum threshold to a maximum value; retrieving, from memory, a compressed version of the first image with the pixels set to the minimum value and a compressed version of the second image with the pixels set to the maximum value; generating a first decompressed image including the first image with the pixels set to the minimum value and a second decompressed image including the second image with the pixels set to the maximum value; and generating an HDR image based on the first and second decompressed images.

30 Claims, 6 Drawing Sheets

SMART HIGH DYNAMIC RANGE IMAGE CLAMPING

TECHNICAL FIELD

The present disclosure generally relates to generating high dynamic range (HDR) images. For example, aspects of the present disclosure relate to systems and techniques for reducing power and bandwidth used by an image processing system to generate a high dynamic range image.

BACKGROUND

A camera is a device that receives light and captures image frames, such as still images or video frames, using an image sensor. Cameras may include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. Some camera settings are determined and applied before or while an image is captured, such as ISO, exposure time (also referred to as exposure duration), aperture size, f/stop, shutter speed, focus, and gain, among others. Moreover, some camera settings can be configured for post-processing of an image, such as alterations to a contrast, brightness, saturation, sharpness, levels, curves, and colors, among others.

BRIEF SUMMARY

Systems and techniques are described herein for reducing a power and bandwidth used by an image processing system to generate a high dynamic range image. According to at least one example, a method is provided for processing image data. The method includes: obtaining, from one or more image sensors, a first image having a first exposure time and a second image having a second exposure time, wherein the second exposure time is greater than the first exposure time; setting one or more first pixel values of the first image that are below a minimum threshold to a minimum pixel value and one or more second pixel values of the second image that are above a maximum threshold to a maximum pixel value; storing, in the memory, a compressed version of the first image with the one or more first pixel values set to the minimum pixel value and a compressed version of the second image with the one or more second pixel values set to the maximum pixel value; retrieving, from the memory, the compressed version of the first image and the compressed version of the second image; generating, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and generating a high dynamic range (HDR) image based on the first decompressed image and the second decompressed image.

In another example, an apparatus for processing image data is provided that includes at least one memory and at least one processor coupled to the at least one memory. The at least one processor is configured to: obtain, from one or more image sensors, a first image having a first exposure time and a second image having a second exposure time, wherein the second exposure time is greater than the first exposure time; set one or more first pixel values of the first image that are below a minimum threshold to a minimum pixel value and one or more second pixel values of the second image that are above a maximum threshold to a maximum pixel value; store, in the memory, a compressed version of the first image with the one or more first pixel values set to the minimum pixel value and a compressed version of the second image with the one or more second pixel values set to the maximum pixel value; retrieving, from the memory, the compressed version of the first image and the compressed version of the second image; generate, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and generate a high dynamic range (HDR) image based on the first decompressed image and the second decompressed image.

In another example, a non-transitory computer-readable medium is provided that has stored thereon instructions that, when executed by one or more processors, cause the one or more processors to: obtain, from one or more image sensors, a first image having a first exposure time and a second image having a second exposure time, wherein the second exposure time is greater than the first exposure time; set one or more first pixel values of the first image that are below a minimum threshold to a minimum pixel value and one or more second pixel values of the second image that are above a maximum threshold to a maximum pixel value; storing, in the memory, a compressed version of the first image with the one or more first pixel values set to the minimum pixel value and a compressed version of the second image with the one or more second pixel values set to the maximum pixel value; retrieve, from the memory, the compressed version of the first image and the compressed version of the second image; generate, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and generate a high dynamic range (HDR) image based on the first decompressed image and the second decompressed image.

In another example, an apparatus for processing image data is provided. The apparatus includes: means for obtaining, from one or more image sensors, a first image having a first exposure time and a second image having a second exposure time, wherein the second exposure time is greater than the first exposure time; means for setting one or more first pixel values of the first image that are below a minimum threshold to a minimum pixel value and one or more second pixel values of the second image that are above a maximum threshold to a maximum pixel value; means for storing, in the memory, a compressed version of the first image with the one or more first pixel values set to the minimum pixel value and a compressed version of the second image with the one or more second pixel values set to the maximum pixel value; means for retrieving, from the memory, the compressed version of the first image and the compressed version of the second image; means for generating, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and means for generating a high dynamic range (HDR) image based on the first decompressed image and the second decompressed image.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone" or other mobile device), a wearable device, a personal computer, a laptop computer, a tablet computer, a server computer, a robotics device or system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
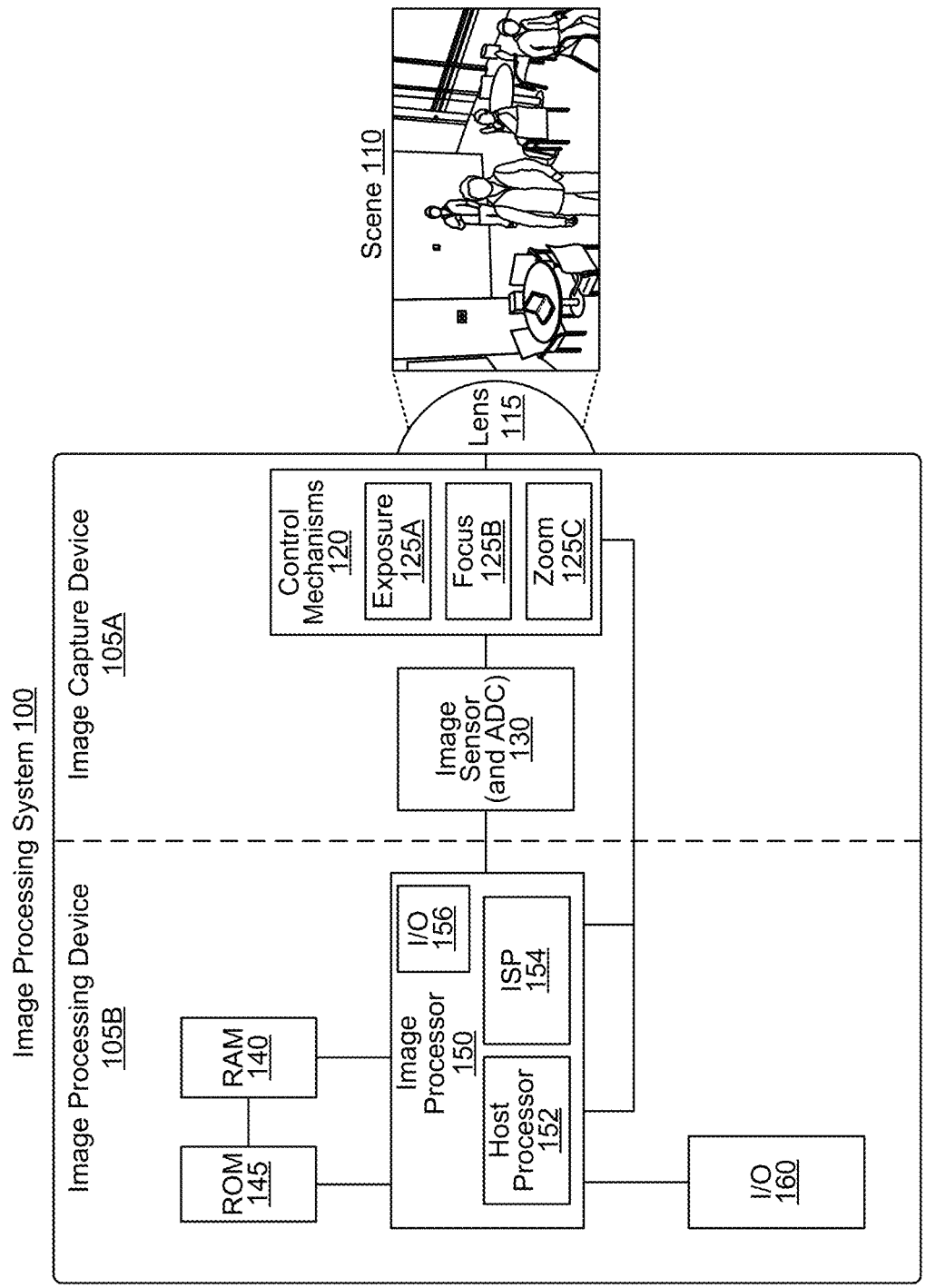
FIG. 1 is a block diagram illustrating an example architecture of an image processing system, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) can implement cameras to capture images or video frames of a scene, a person(s), an animal(s), and/or any object(s). A camera can refer to a device that receives light and captures image frames, such as still images or video frames, using an image sensor. The terms "image," "image frame," and "frame" are used interchangeably herein. A camera system can include processors (e.g., an image signal processor (ISP), etc.) that can receive one or more images and process the one or more images. For example, a raw image captured by a camera sensor can be processed by an ISP to generate a final image. Processing by the ISP can be performed by filters or processing blocks applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with camera hardware to capture image frames, such as still images and/or video frames, for consumption. For example, an electronic device can include a camera to allow the electronic device to capture a video or image of a scene, a person, an object, etc. A camera is a device that receives light and captures image frames (e.g., still images or video frames) using an image sensor. In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, an electronic device implementing a camera can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

Moreover, cameras can be configured with a variety of image capture and image processing settings to alter the appearance of an image. Some camera settings can be determined and applied before or while an image is captured, such as ISO, exposure time (also referred to as exposure duration), aperture size, f/stop, shutter speed, focus, and gain, among others. Some camera settings can be configured for post-processing of an image, such as alterations to a contrast, brightness, saturation, sharpness, levels, curves, and colors, among others. In some examples, a camera can be configured with certain settings to adjust the exposure of an image captured by the camera.

In photography, the exposure of an image captured by a camera refers to the amount of light per unit area that reaches a photographic film, or in modern cameras, an electronic image sensor. The exposure is based on certain camera settings such as, for example, shutter speed, exposure time, and/or lens aperture, as well as the luminance of the scene being photographed. Many cameras are equipped with an automatic exposure or "auto exposure" mode, where the exposure settings (e.g., shutter speed, exposure time, lens aperture, etc.) of the camera may be automatically adjusted to match, as closely as possible, the luminance of a scene or subject being photographed. In some cases, an automatic exposure control (AEC) engine can perform AEC to determine exposure settings for an image sensor.

In photography and videography, a technique called high dynamic range (HDR) allows the dynamic range of image frames captured by a camera to be increased beyond the native capability of the camera. In this context, a dynamic range refers to the range of luminosity between the brightest area and the darkest area of the scene or image frame. For example, a high dynamic range means there is a lot of variation in light levels within a scene or an image frame. HDR can involve capturing multiple image frames of a scene with different exposures and combining captured image frames with the different exposures into a single image frame. The combination of image frames with different exposures can result in an image with a dynamic range higher than that of each individual image frame captured and combined to form the HDR image frame. For example, the electronic device can create a high dynamic range scene by fusing two or more exposure frames into a single frame. HDR is a feature often used by electronic devices, such as smartphones and mobile devices, for various purposes. For example, in some cases, a smartphone can use HDR to achieve a better image quality or an image quality similar to the image quality achieved by a digital single-lens reflex (DSLR) camera.

In some examples, the electronic device can create an HDR image using multiple image frames with different exposures. For example, the electronic device can create an HDR image using a short exposure (SE) image, a medium exposure (ME) image, and a long exposure (LE) image. As another example, the electronic device can create an HDR image using an SE image and an LE image. In some cases, the electronic device can write the different image frames from camera frontends to a memory device, such as a double data rate (DDR) synchronous dynamic random-access memory (SDRAM) or any other memory device. A processing engine can then retrieve the image frames to fuse the image frames into a single image. However, the different write and read operations used to create the HDR image can result in significant power and bandwidth consumption.

Generally, the over-exposed pixels of long exposure images and under-exposed pixels of short exposure images do not contribute to the final fused image (e.g., the HDR image) produced by the HDR algorithm. Nevertheless, the over-exposed pixels of long exposure images and under-exposed pixels of short exposure images are still written from the camera frontend to the memory device and read back from the memory device by the processing engine. Thus, the operations to read and write the over-exposed pixels of long exposure images and under-exposed pixels of short exposure images contribute to the power and bandwidth consumption of the electronic device even though such pixels do not contribute to the final fused image.

Systems, apparatuses, methods (also referred to as processes), and computer-readable media (collectively referred to herein as "systems and techniques") are described herein for reducing power and bandwidth consumption when creating an HDR image. In some examples, the systems and techniques described herein can optimize the HDR algorithm and reduce the power and bandwidth consumption when creating an HDR image. In some cases, the systems and techniques described herein can reduce the power and bandwidth consumption when creating an HDR image by removing redundant pixel information and/or pixel information that does not contribute towards the final output when creating an HDR image.

For example, the systems and techniques herein can clamp pixels do not contribute to the final fused image (e.g., the HDR image), such as the over-exposed pixels of a long exposure image and the under-exposed pixels of a short exposure image, and compress the clamped long exposure image and short exposure image. Since the clamped pixels of the long exposure image have the same maximum value and the clamped pixels of the short exposure image have the same minimum value, the amount of information that is compressed is reduced and/or the compression ratio is increased. Thus, given the higher compression ratio for the long and short exposure images, the systems and techniques described herein can reduce the power and bandwidth used to process, store (e.g., write to memory), and retrieve (e.g., read from memory) the compressed images.

In some examples, the systems and techniques described herein can clamp the pixels present in an over-saturated region(s) of a long exposure image to a maximum value. In some cases, if all neighboring pixels in a kernel of pixels (e.g., in an N×N kernel such as a 5×5 kernel) are above a maximum threshold value, the systems and techniques described herein can clamp the center pixel(s) of the kernel in the long exposure image to a maximum value. In some examples, the clamped image is then passed through a compression block that provides a higher compression ratio (e.g., than the compression of the long exposure image without the clamping) since the pixels in the saturated region (e.g., the clamped pixels) of the long exposure image have the same maximum value.

Moreover, the systems and techniques described herein can clamp the pixels present in an under-saturated region(s) of a short exposure image to a minimum value. In some cases, if all neighboring pixels in a kernel of pixels (e.g., in an N×N kernel such as a 5×5 kernel) are below a minimum threshold value, the systems and techniques described herein can clamp the center pixel(s) in the kernel of the short exposure image to a minimum value. In some examples, the clamped image is then passed through a compression block that provides a higher compression ratio (e.g., than the compression of the short exposure image without the clamping) since the pixels in the under-saturated region (e.g., the clamped pixels) of the short exposure image have the same minimum value.

In some examples, the systems and techniques described herein can similarly clamp pixels in a saturated region and/or an under-saturated region when creating an HDR image from two image exposures. For example, in some implementations involving two exposures used to create the HDR image, one of the two exposure images can be used as the primary anchor image (e.g., the reference image) while the other exposure image is used as a secondary auxiliary image. The systems and techniques described herein can apply aggressive clamping on the secondary image while applying a more conservative clamping for the anchor image. For example, if a long exposure image frame is used as the anchor image, the systems and techniques described herein can apply more conservative clamping to the long exposure image frame by setting a maximum threshold value to a high value (e.g., by increasing the maximum threshold). The systems and techniques described herein can apply more relatively aggressive clamping to the short exposure image by setting the minimum threshold value to a high value (e.g., by increasing the minimum threshold). Such clamping provides significant power and bandwidth savings when creating an HDR image without negatively impacting the visual quality of the HDR image.

In some examples, the minimum threshold and the maximum threshold can be configured in software. In some cases, the minimum threshold and the maximum threshold can be updated per frame (e.g., depending on 3A (auto-focus, auto-exposure, auto-whitebalance) auto-exposure data from the previous frame). In some cases, the minimum threshold and the maximum threshold can be configurable as per one or more image sensor requirements such as, for example and without limitation, bits-per-pixel, black-level, etc. In some examples, the system and techniques described herein can enable or disable the smart HDR clamping described above via software.

Moreover, due to the high bandwidth compression associated with the smart HDR clamping process described above, the amount of data written from the camera frontend to the memory device can be reduced, as well as the amount of data read from the memory device by the processing engine. The reduction in the amount of data written to and read from the memory device can provide a significant reduction in the power and bandwidth used by the HDR algorithm implemented to create the HDR image.

Various aspects of the application will be described with respect to the figures.

FIG. 1 is a block diagram illustrating an example architecture of an image processing system 100. The image processing system 100 includes various components that are used to capture and process images, such as an image of a scene 110. The image processing system 100 can capture image frames (e.g., still images or video frames). In some cases, the lens 115 and image sensor 130 can be associated with an optical axis. In one illustrative example, the photosensitive area of the image sensor 130 (e.g., the photodiodes) and the lens 115 can both be centered on the optical axis.

In some examples, the lens 115 of the image processing system 100 faces a scene 110 and receives light from the scene 110. The lens 115 bends incoming light from the scene toward the image sensor 130. The light received by the lens 115 then passes through an aperture of the image processing system 100. In some cases, the aperture (e.g., the aperture size) is controlled by one or more control mechanisms 120. In other cases, the aperture can have a fixed size.

The one or more control mechanisms 120 can control exposure, focus, and/or zoom based on information from the image sensor 130 and/or information from the image processor 150. In some cases, the one or more control mechanisms 120 can include multiple mechanisms and components. For example, the control mechanisms 120 can include one or more exposure control mechanisms 125A, one or more focus control mechanisms 125B, and/or one or more zoom control mechanisms 125C. The one or more control mechanisms 120 may also include additional control mechanisms besides those illustrated in FIG. 1. For example, in some cases, the one or more control mechanisms 120 can include control mechanisms for controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting the focus. In some cases, additional lenses may be included in the image processing system 100. For example, the image processing system 100 can include one or more microlenses over each photodiode of the image sensor 130. The microlenses can each bend the light received from the lens 115 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and the focus control mechanism 125B.

The exposure control mechanism 125A of the control mechanisms 120 can obtain an exposure setting. In some cases, the exposure control mechanism 125A stores the exposure setting in a memory register. Based on the exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, the image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 6:
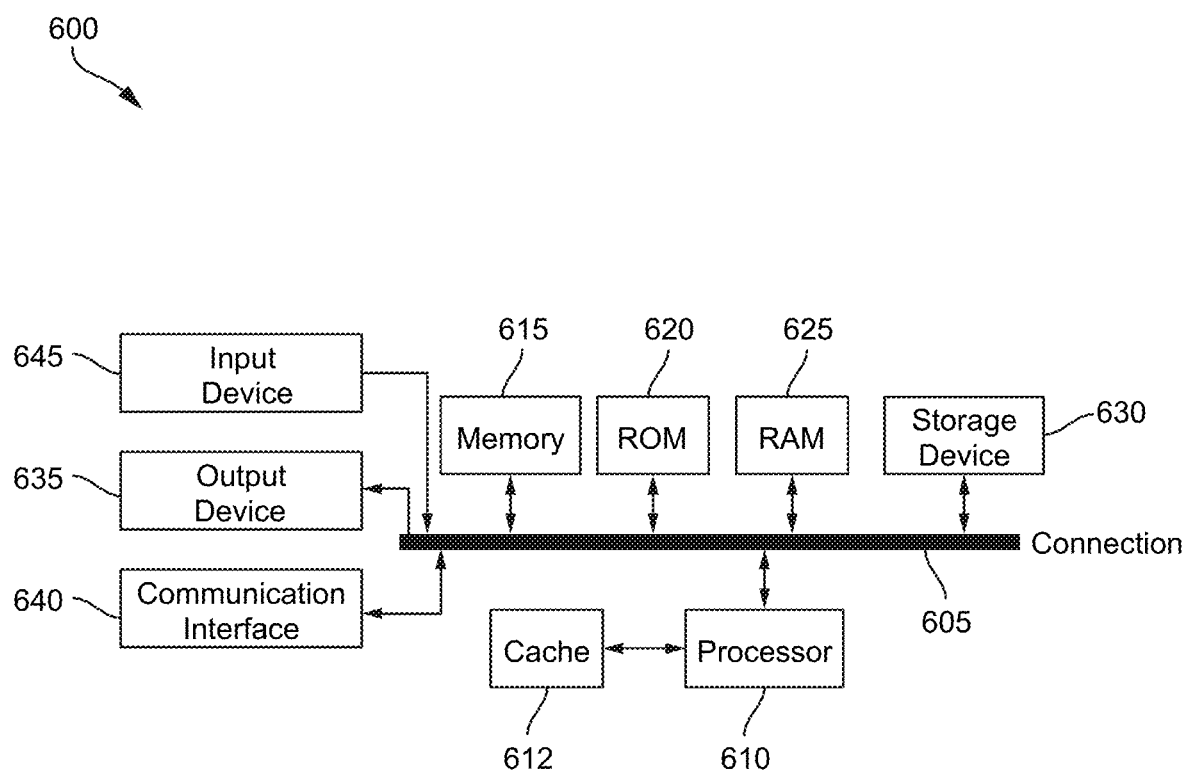
FIG. 6 illustrates an example computing device architecture, in accordance with some examples of the present disclosure.

The image processor 150 may include one or more processors, such as one or more image signal processors (ISPs) (including ISP 154), one or more host processors (including host processor 152), and/or one or more of any other type of processor discussed with respect to the computing system 600 of FIG. 6. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140, read-only memory (ROM) 145, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or any combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image processing system 100 and one or more peripheral devices, over which the image processing system 100 may receive data from the one or more peripheral device and/or transmit data to the one or more peripheral devices. The I/O devices 160 may include one or more wireless transceivers that enable a wireless connection between the image processing system 100 and one or more peripheral devices, over which the image processing system 100 may receive data from the one or more peripheral device and/or transmit data to the one or more peripheral devices. The peripheral devices may include any of the previously-discussed types of the I/O devices 160 and may themselves be considered I/O devices 160 once they are coupled to the ports, jacks, wireless transceivers, or other wired and/or wireless connectors.

In some cases, the image processing system 100 may be a single device. In some cases, the image processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A. In some examples, the image processing system 100 can include one or more wireless transceivers for wireless communications, such as cellular network communications, 802.11 wi-fi communications, wireless local area network (WLAN) communications, or some combination thereof.

The image processing system 100 can be part of, or implemented by, a single computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

The image capture device 105A and the image processing device 105B can be part of the same electronic device or different electronic devices. In some implementations, the image capture device 105A and the image processing device 105B can be different devices. For instance, the image capture device 105A can include a camera device and the image processing device 105B can include a computing device, such as a mobile device, a desktop computer, a smartphone, a smart television, a game console, or other computing device.

While the image processing system 100 is shown to include certain components, one of ordinary skill will appreciate that the image processing system 100 can include more components than those shown in FIG. 1. The components of the image processing system 100 can include software, hardware, or one or more combinations of software and hardware. For example, in some implementations, the components of the image processing system 100 can include and/or can be implemented using electronic circuits or other electronic hardware, which can include one or more programmable electronic circuits (e.g., microprocessors, GPUs, DSPs, CPUs, and/or other suitable electronic circuits), and/ or can include and/or be implemented using computer software, firmware, or any combination thereof, to perform the various operations described herein. The software and/or firmware can include one or more instructions stored on a computer-readable storage medium and executable by one or more processors of the electronic device implementing the image processing system 100.

In some examples, the computing system 600 shown in FIG. 6 and further described below can include the image processing system 100, the image capture device 105A, the image processing device 105B, or a combination thereof.

In some examples, the image processing system 100 can create an HDR image using multiple image frames with different exposures. For example, the image processing system 100 can create an HDR image using a short exposure (SE) image, a medium exposure (ME) image, and a long exposure (LE) image. As another example, the image processing system 100 can create an HDR image using an SE image and an LE image. In some cases, the image processing system 100 can write the different image frames from one or more camera frontend engines to a memory device, such as a DDR memory device or any other memory device. A post-processing engine can then retrieve the image frames and fuse (e.g., merge, combine) them into a single image. As previously explained, the different write and read operations used to create the HDR image can result in significant power and bandwidth consumption.

Figure 2:
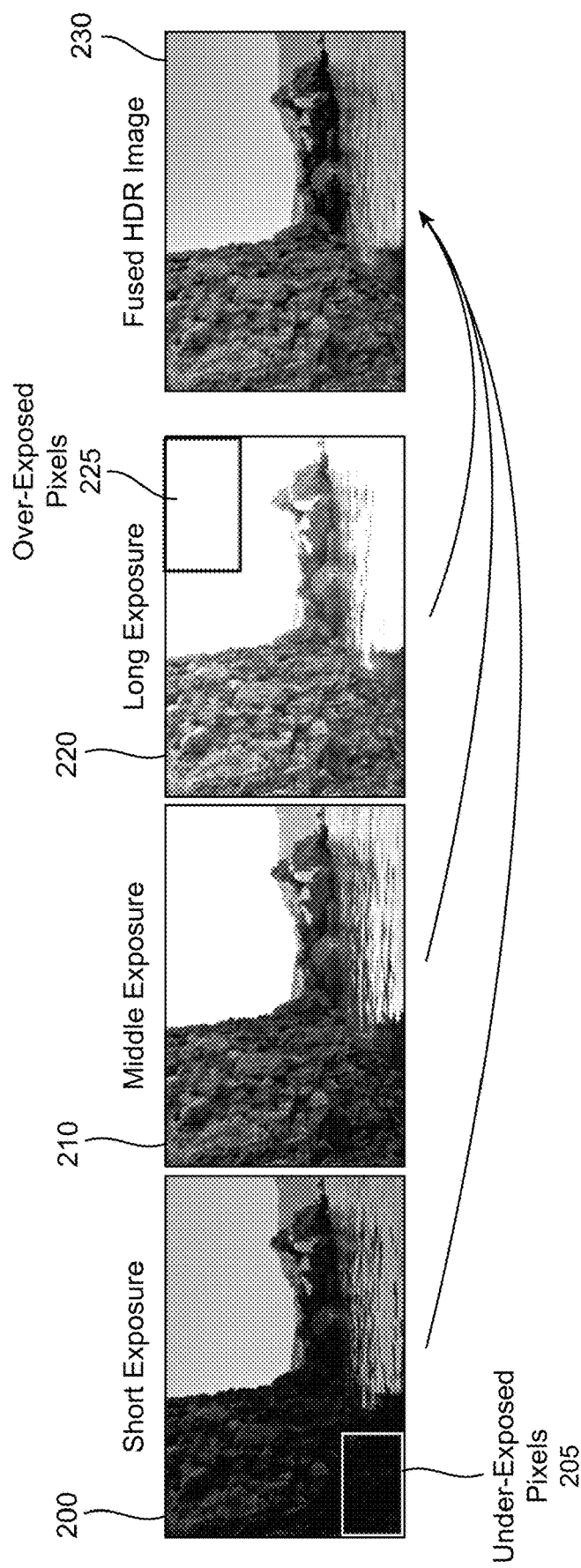
FIG. 2 illustrates multiple images with different exposures used to create a fused high dynamic range image, in accordance with some examples of the present disclosure.

As previously explained, when creating an HDR image, over-exposed pixels of a long exposure image and under-exposed pixels of a short exposure image generally do not contribute to the final HDR image produced by the image processing system 100. For example, FIG. 2 illustrates multiple images with different exposures used to create a fused HDR image (e.g., HDR image 230). In particular, FIG. 2 shows a short exposure image 200, a medium exposure image 210, a long exposure image 220, and an HDR image 230 generated by combining or fusing together the short exposure image 200, the medium exposure image 210, and the long exposure image 220. The short exposure image 200 includes under-exposed pixels 205, and the long exposure image 220 includes over-exposed pixels 225.

As shown in FIG. 2, the under-exposed pixels 205 in the short exposure image 200 and the over-exposed pixels 225 in the long exposure image 220 do not contribute to the pixels of the HDR image 230. Nevertheless, generally, when creating the HDR image 230, the image processing system 100 still writes the under-exposed pixels 205 in the short exposure image 200 and the over-exposed pixels 225 in the long exposure image 220 from a camera frontend engine(s) of the image processing system 100 to a memory device and reads them back (e.g., via a post-processing engine) from the memory device. Thus, the operations to read and write the under-exposed pixels 205 in the short exposure image 200 and the over-exposed pixels 225 in the long exposure image 220 contribute to the overall power and bandwidth consumption of the image processing system 100 when creating the HDR image 230, even though such pixels do not contribute to the HDR image 230.

In some examples, the image processing system 100 can reduce the overall power and bandwidth consumption of the image processing system 100 when creating an HDR image, such as HDR image 230, by optimizing the HDR process implemented to create the HDR image. For example, in some cases, the image processing system 100 can reduce its power and bandwidth consumption when creating an HDR image by removing redundant pixel information and/or pixel information that does not contribute towards the final output.

For example, the image processing system 100 can clamp pixels that do not contribute to the output HDR image, such as the under-exposed pixels 205 in the short exposure image 200 and/or the over-exposed pixels 225 in the long exposure image 220, and thus reduce the amount of information processed (e.g., compressed, written to memory, read from memory, etc.).

Figure 3:
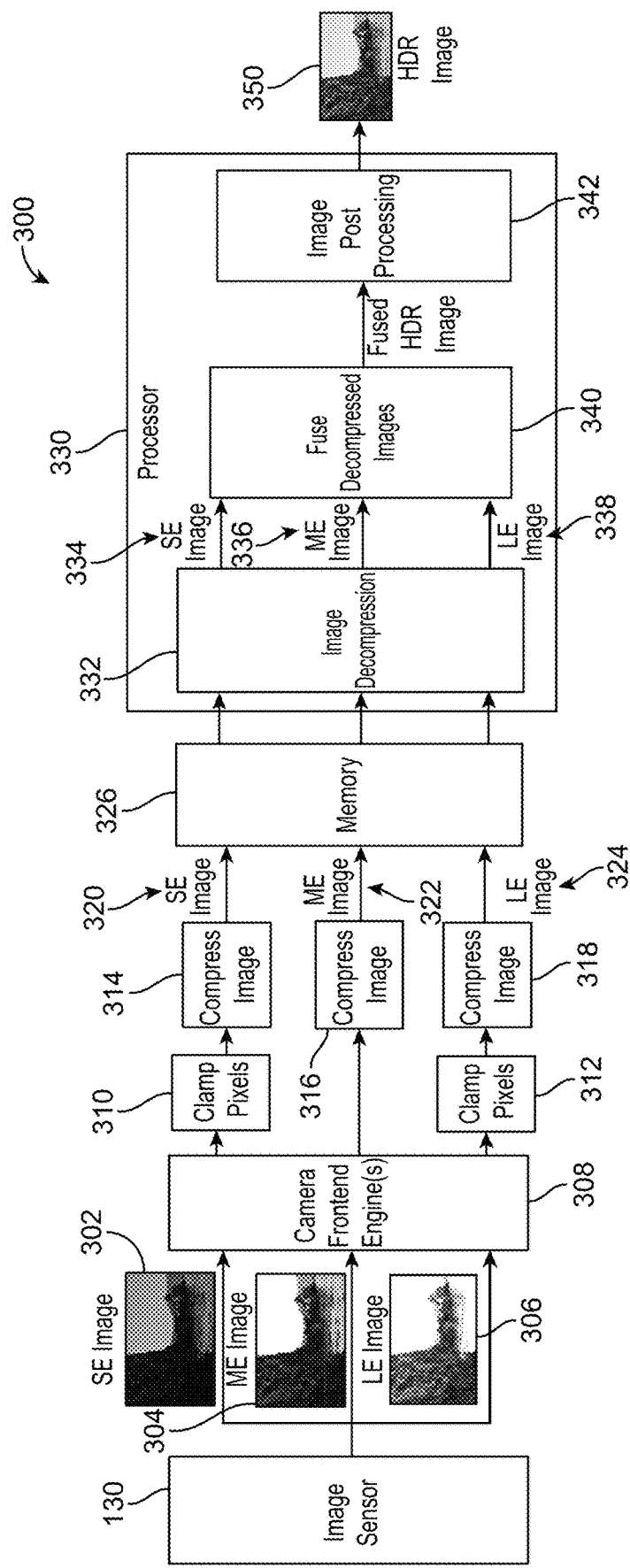
FIG. 3 is a flow diagram illustrating an example system process for reducing the power and bandwidth used to generate a high dynamic range image, in accordance with some examples of the present disclosure.

FIG. 3 is a flow diagram illustrating an example system process 300 for reducing the power and bandwidth used to generate an HDR image. In this example, the system process 300 generates an HDR image (e.g., HDR image 350) using three images with different exposures. As shown, the image sensor 130 can capture a short-exposure (SE) image 302 of a scene, a medium-exposure (ME) image 304 of the scene, and a long-exposure (LE) image 306 of the scene.

The SE image 302 can include an image with an exposure time below a threshold, the ME image 304 can include an image with an exposure time above a minimum threshold and below a maximum threshold (and/or within a range of exposure times), and the LE image 306 can include an image with an exposure time above a threshold. Moreover, the exposure time of the SE image 302 is less than the exposure time of the ME image 304, and the exposure time of the ME image 304 is less than the exposure time of the LE image 306.

The image sensor 130 can provide the SE image 302, the ME image 304, and the LE image 306 to the camera frontend engine(s) 308 for processing. For simplicity and explanation purposes, the camera frontend engine(s) 308 is shown in FIG. 3 as a single camera frontend engine. However, the camera frontend engine(s) 308 can include one camera frontend engine or multiple camera frontend engines. For example, in some cases, the camera frontend engine(s) 308 can include a single camera frontend engine and, in other cases, the camera frontend engine(s) 308 can include multiple camera frontend engines. In one illustrative example, the camera frontend engine(s) can include a camera frontend engine for processing the SE image 302, another camera frontend engine for processing the ME image 304, and another camera frontend engine for processing the LE image 306. Thus, in this illustrative example, the camera frontend engine(s) 308 can include a camera frontend engine for each of the images (e.g., the SE image 302, the ME image 304, and the LE image 306) captured by the image sensor 130.

The camera frontend engine(s) 308 can apply one or more pre-processing operations to each of the SE image 302, the ME image 304, and the LE image 306. The pre-processing operations can include, for example and without limitation, a pixel brightness transformation (e.g., brightness correction, grey scale transformation, etc.), color space conversion, geometric transformation (e.g., rotation, scaling, translation, affine transformation, resizing, etc.), image filtering (e.g., image and/or edge smoothing and/or enhancement, denoising, image sharpening, etc.), image warping, image segmentation, image restoration, image enhancement, lens shading, color correction, black level adjustment, lens distortion correction, faulty pixel replacement, demosaicking, color balancing, compression, interpolation, any other image pre-processing operations, and/or a combination thereof.

The camera frontend engine(s) 308 can also clamp pixel values in order to reduce or eliminate any redundant pixel information in any of the images (e.g., SE image 302, ME image 304, and/or LE image 306) and/or pixel information that does not contribute towards the final output (e.g., the HDR image 350), and thereby reduce the power and bandwidth used by the image processing system 100 to create the HDR image 350. For example, the image processing system 100 can remove pixels do not contribute to the final output HDR image (e.g., HDR image 350), such as under-exposed pixels (e.g., under-exposed pixels 205 shown in FIG. 2) in the SE image 302 and/or over-exposed pixels (e.g., over-exposed pixels 225 shown in FIG. 2) in the LE image 306.

In the example shown in FIG. 3, the camera frontend engine(s) 308 can clamp 310 pixels in one or more under-saturated regions of the SE image 302 and clamp 312 pixels in one or more over-saturated regions of the LE image 306. The camera frontend engine(s) 308 can clamp 310 pixels in one or more under-saturated regions of the SE image 302 to a minimum value (and/or a minimum threshold) and clamp 312 pixels in one or more over-saturated regions of the LE image 306 to a maximum value (and/or a maximum threshold).

For example, for any pixels in the SE image 302 having a pixel value that is below a minimum threshold, the camera frontend engine(s) 308 can set the values of such pixels in the SE image 302 to a minimum value. In other words, for any pixels in the SE image 302 having a pixel value that is below a minimum threshold, the camera frontend engine(s) 308 can increase the values of such pixels to the minimum value. Similarly, for any pixels in the LE image 306 having a pixel value that is above a maximum threshold, the camera frontend engine(s) 308 can set the values of such pixels in the LE image 306 to a maximum value. Thus, for any pixels in the LE image 306 having a pixel value that is above a maximum threshold, the camera frontend engine(s) 308 can decrease the values of such pixels to the maximum value.

In some examples, if all neighboring pixels in an N×N kernel of the SE image 302, such as a 5×5 kernel, are below a minimum threshold value, the camera frontend engine(s) 308 can clamp 310 the center pixel(s) of the kernel in the SE image 302 to a minimum value. Moreover, if all neighboring pixels in an N×N kernel of the LE image 306, such as a 5×5 kernel, are above a maximum threshold value, the camera frontend engine(s) 308 can clamp 312 the center pixel(s) of the kernel in the LE image 306 to a maximum value.

After the camera frontend engine(s) 308 clamps pixels of the SE image 302 and the LE image 306 as previously described, the camera frontend engine(s) 308 (or another component of the image processing system 100) can perform image compression 314 to compress the SE image 302, image compression 316 to compress the ME image 304, and image compression 318 to compress the LE image 306. The image compression 314 can provide a higher compression ratio for the clamped SE image than the SE image without clamping since the clamped pixels (e.g., the pixels in the under-saturated region(s)) have the same minimum value, and the image compression 318 can provide a higher compression ratio for the clamped LE image than the LE image without clamping since the clamped pixels (e.g., the pixels in the saturated region(s)) have the same maximum value. This way, the clamping and image compression performed in the system process 300 can reduce the amount of information processed, written from memory, and read from memory by the image processing system 100, and thus can reduce the power and bandwidth consumption by the image processing system 100 when generating the HDR image (e.g., HDR image 350).

In some cases, the image compression 314, 316, and 318 can include Bayer pattern compression. In some examples, the image compression 314, 316, and 318 can include Huffman coding. In some cases, the image compression 314 can separately compresses each of the channels (e.g., red, green, and blue) of the SE image 302. Similarly, the image compression 316 can separately compress each of the channels of the ME image 304, and the image compression 318 can separately compress each of the channels of the LE image 306.

The camera frontend engine(s) 308 can then write the compressed SE image 320, the compressed ME image 322, and the compressed LE image 324 to memory 326. The memory 326 can include any memory device. For example, in some cases, the memory 326 can include the RAM 140 of the image processing system 100 shown in FIG. 1. In other cases, the memory 326 can include any of the memory device of computing system 600 shown in FIG. 6. In one illustrative example, the memory 326 can include a DDR memory device. In other illustrative examples, the memory 326 can include any other type of memory device.

A processor 330 of the image processing system 100 can retrieve the compressed SE image 320, the compressed ME image 322, and the compressed LE image 324 from the memory 326 and perform image decompression 332 on the compressed SE image 320, the compressed ME image 322, and the compressed LE image 324. The processor 330 can include one or more processors. Moreover, the processor 330 can include any type of processors such as, for example, a CPU, a DSP, an ISP, an application-specific integrated circuit, etc. In one illustrative example, the processor 330 can include an ISP, such as ISP 154 shown in FIG. 1.

Based on the image decompression 332, the processor 330 can decompress the compressed SE image 320, the compressed ME image 322, and the compressed LE image 324, and generate a decompressed SE image 334, a decompressed ME image 336, and a decompressed LE image 338. The decompressed ME image 336 can include the ME image 304. Moreover, the decompressed SE image 334 can include the SE image 302 with the clamped pixels as previously described, and the decompressed LE image 338 can include the LE image 306 with the clamped pixels as previously described.

The processor 330 can then perform image fusion 340 to fuse the decompressed SE image 334, a decompressed ME image 336, and a decompressed LE image 338 into a fused HDR image. For example, the processor 330 can combine/merge the decompressed SE image 334, a decompressed ME image 336, and a decompressed LE image 338 into a single, fused HDR image that has a higher dynamic range than either the SE image 302, the ME image 304, or the LE image 306.

The processor 330 can perform one or more image post-processing operations 342 on the fused HDR image generated based on the image fusion 340. The processor 330 can output an HDR image 350 based on the one or more image post-processing operations 342 performed on the fused HDR image. The one or more image post-processing operations 342 can include, for example and without limitation, a filtering operation, a blending operation (e.g., blending pixel values) and/or interpolation operation, a pixel brightness transformation (e.g., brightness correction, grey scale transformation, etc.), a color space conversion, a geometric transformation (e.g., rotation, scaling, translation, affine transformation, resizing, etc.), a cropping operation, a white balancing operation, a denoising operation, an image sharpening operation, chroma sampling, image scaling, a lens correction operation, a segmentation operation, a filtering operation (e.g., filtering in terms of adjustments to the quality of the image in terms of contrast, noise, texture, resolution, etc.), an image warping operation, an image restoration operation, a lens shading operation, a lens distortion correction operation, a faulty pixel replacement operation, a demosaicking operation, a color balancing operation, a smoothing operation, an image enhancement operation, an operation for implementing an image effect or stylistic adjustment, a feature enhancement operation, an image scaling or resizing operation, a color correction operation, a black level adjustment operation, a linearization operation, a gamma correction operation, any other image post-processing operations, and/or a combination thereof.

Figure 4:
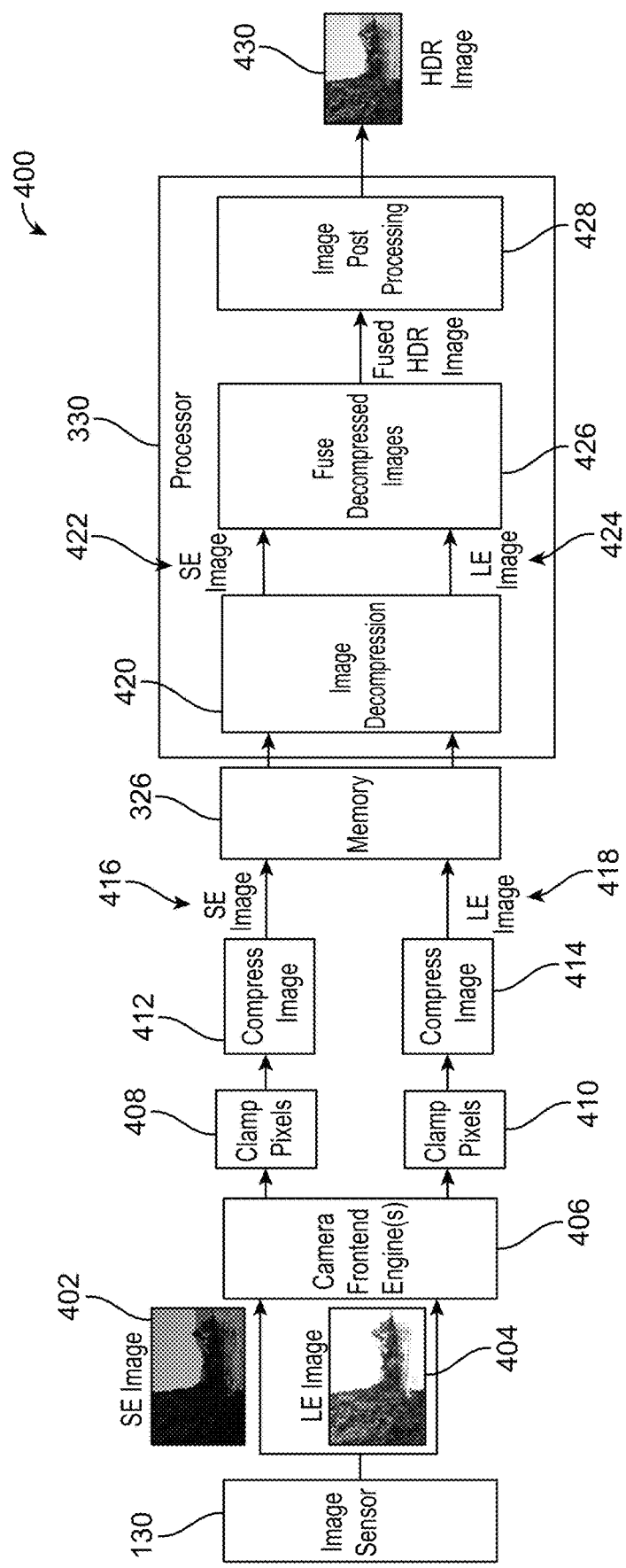
FIG. 4 is a flow diagram illustrating another example system process for reducing the power and bandwidth used to generate a high dynamic range image, in accordance with some examples of the present disclosure.

FIG. 4 is a flow diagram illustrating another example system process 400 for reducing the power and bandwidth used to generate an HDR image. In this example, the system process 400 generates an HDR image (e.g., HDR image 430) using two images with different exposures. As shown, the image sensor 130 can capture a short-exposure (SE) image 402 of a scene and a long-exposure (LE) image 404 of the scene. The image processing system 100 can use the SE image 402 and the LE image 404 to generate an HDR image (e.g., HDR image 430).

The SE image 402 can include an image with an exposure time below a first threshold and the LE image 404 can include an image with an exposure time above a second threshold, which can be the same or different than the first threshold. Moreover, the exposure time of the SE image 402 is less than the exposure time of the LE image 404. The image sensor 130 can provide the SE image 402, the ME image 304, and the LE image 404 to the camera frontend engine(s) 406 for processing. For simplicity and explanation purposes, the camera frontend engine(s) 406 is shown in FIG. 4 as a single camera frontend engine. However, the camera frontend engine(s) 406 can include one camera frontend engine or multiple camera frontend engines. For example, in some cases, the camera frontend engine(s) 406 can include a single camera frontend engine and, in other cases, the camera frontend engine(s) 406 can include multiple camera frontend engines. In one illustrative example, the camera frontend engine(s) can include a camera frontend engine for processing the SE image 402 and another camera frontend engine for processing the LE image 404. Thus, in this illustrative example, the camera frontend engine(s) 406 can include a camera frontend engine for each of the images (e.g., the SE image 402 and the LE image 404) captured by the image sensor 130.

The camera frontend engine(s) 406 can apply one or more pre-processing operations to the SE image 402 and the LE image 404. The pre-processing operations can include, for example and without limitation, a pixel brightness transformation (e.g., brightness correction, grey scale transformation, etc.), color space conversion, geometric transformation (e.g., rotation, scaling, translation, affine transformation, resizing, etc.), image filtering (e.g., image and/or edge smoothing and/or enhancement, denoising, image sharpening, etc.), image warping, image segmentation, image restoration, image enhancement, lens shading, color correction, black level adjustment, lens distortion correction, faulty pixel replacement, demosaicking, color balancing, compression, interpolation, any other image pre-processing operations, and/or a combination thereof.

The camera frontend engine(s) 406 can also clamp pixel values in order to reduce or eliminate any redundant pixel information in any of the images (e.g., SE image 402 and LE image 404) and/or pixel information that does not contribute towards the final output (e.g., the HDR image 430), and thereby reduce the power and bandwidth used by the image processing system 100 to create the HDR image 430. For example, the image processing system 100 can remove pixels do not contribute to the final output HDR image (e.g., HDR image 430), such as under-exposed pixels (e.g., under-exposed pixels 205 shown in FIG. 2) in the SE image 402 and/or over-exposed pixels (e.g., over-exposed pixels 225 shown in FIG. 2) in the LE image 404.

In the example shown in FIG. 4, the camera frontend engine(s) 406 can clamp 408 pixels in one or more under-saturated regions of the SE image 402 and clamp 410 pixels in one or more over-saturated regions of the LE image 404. The camera frontend engine(s) 406 can clamp 408 pixels in one or more under-saturated regions of the SE image 402 to a minimum value (and/or a minimum threshold) and clamp 410 pixels in one or more over-saturated regions of the LE image 404 to a maximum value (and/or a maximum threshold).

For example, for any pixels in the SE image 402 having a pixel value that is below a minimum threshold, the camera frontend engine(s) 406 can set the values of such pixels in the SE image 402 to a minimum value. In other words, for any pixels in the SE image 402 having a pixel value that is below a minimum threshold, the camera frontend engine(s) 406 can increase the values of such pixels to the minimum value. Similarly, for any pixels in the LE image 404 having a pixel value that is above a maximum threshold, the camera frontend engine(s) 406 can set the values of such pixels in the LE image 404 to a maximum value. Thus, for any pixels in the LE image 404 having a pixel value that is above a maximum threshold, the camera frontend engine(s) 406 can decrease the values of such pixels to the maximum value.

In some examples, if all neighboring pixels in an N×N kernel of the SE image 402, such as a 5×5 kernel, are below a minimum threshold value, the camera frontend engine(s) 406 can clamp 408 the center pixel(s) of the kernel in the SE image 402 to a minimum value. Moreover, if all neighboring pixels in an N×N kernel of the LE image 404, such as a 5×5 kernel, are above a maximum threshold value, the camera frontend engine(s) 406 can clamp 410 the center pixel(s) of the kernel in the LE image 404 to a maximum value.

After the camera frontend engine(s) 406 clamps pixels of the SE image 402 and the LE image 404 as previously described, the camera frontend engine(s) 406 (or another component of the image processing system 100) can perform image compression 412 to compress the SE image 402 and image compression 414 to compress the LE image 404. The image compression 412 can provide a higher compression ratio for the clamped SE image than the SE image without clamping since the clamped pixels (e.g., the pixels in the under-saturated region(s)) have the same minimum value, and the image compression 414 can provide a higher compression ratio for the clamped LE image than the LE image without clamping since the clamped pixels (e.g., the pixels in the saturated region(s)) have the same maximum value. This way, the clamping and image compression performed in the system process 400 can reduce the amount of information processed, written from memory, and read from memory by the image processing system 100, and thus can reduce the power and bandwidth consumption by the image processing system 100 when generating the HDR image (e.g., HDR image 430).

In some cases, the image compression 412 and 414 can include Bayer pattern compression. In some examples, the image compression 412 and 414 can include Huffman coding. In some cases, the image compression 412 can separately compresses each of the channels (e.g., red, green, and blue) of the SE image 402. Similarly, the image compression 414 can separately compress each of the channels of the LE image 404. The camera frontend engine(s) 406 can then write the compressed SE image 416 and the compressed LE image 418 to memory 326.

A processor 330 of the image processing system 100 can retrieve the compressed SE image 416 and the compressed LE image 418 from the memory 326 and perform image decompression 420 on the compressed SE image 416 and the compressed LE image 418. Based on the image decompression 420, the processor 330 can decompress the compressed SE image 416 and the compressed LE image 418, and generate a decompressed SE image 422 and a decompressed LE image 424. The decompressed SE image 422 can include the SE image 402 with the clamped pixels as previously described, and the decompressed LE image 424 can include the LE image 404 with the clamped pixels as previously described.

The processor 330 can then perform image fusion 426 to fuse the decompressed SE image 422 and the decompressed LE image 424 into a fused HDR image. For example, the processor 330 can combine/merge the decompressed SE image 422 and the decompressed LE image 424 into a single, fused HDR image that has a higher dynamic range than either the SE image 402 or the LE image 404.

The processor 330 can perform one or more image post-processing operations 428 on the fused HDR image generated based on the image fusion 426. The processor 330 can output an HDR image 430 based on the one or more image post-processing operations 428 performed on the fused HDR image. The one or more image post-processing operations 428 can include, for example and without limitation, a filtering operation, a blending operation (e.g., blending pixel values) and/or interpolation operation, a pixel brightness transformation (e.g., brightness correction, grey scale transformation, etc.), a color space conversion, a geometric transformation (e.g., rotation, scaling, translation, affine transformation, resizing, etc.), a cropping operation, a white balancing operation, a denoising operation, an image sharpening operation, chroma sampling, image scaling, a lens correction operation, a segmentation operation, a filtering operation (e.g., filtering in terms of adjustments to the quality of the image in terms of contrast, noise, texture, resolution, etc.), an image warping operation, an image restoration operation, a lens shading operation, a lens distortion correction operation, a faulty pixel replacement operation, a demosaicking operation, a color balancing operation, a smoothing operation, an image enhancement operation, an operation for implementing an image effect or stylistic adjustment, a feature enhancement operation, an image scaling or resizing operation, a color correction operation, a black level adjustment operation, a linearization operation, a gamma correction operation, any other image post-processing operations, and/or a combination thereof.

Figure 5:
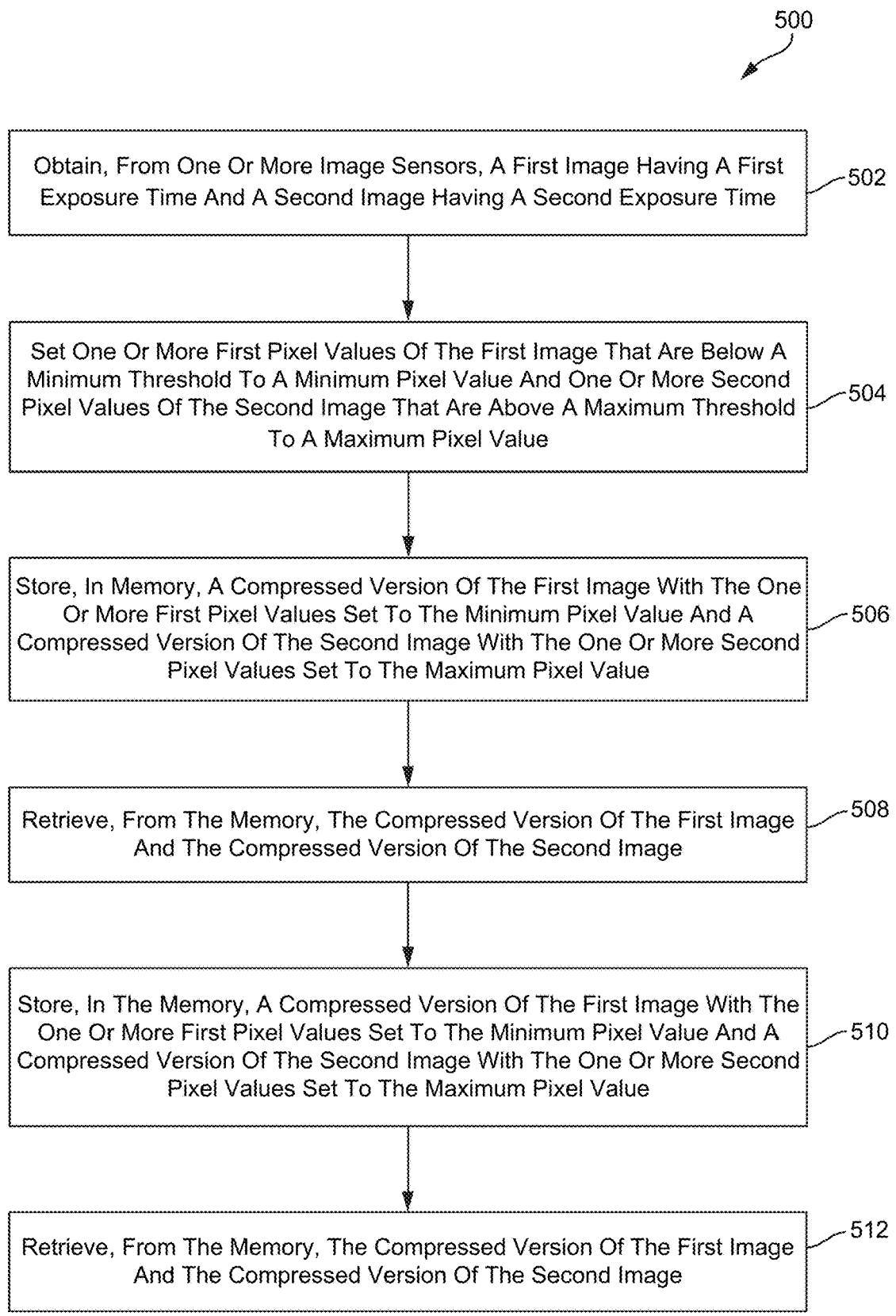
FIG. 5 is a flowchart illustrating an example process for reducing a power and bandwidth used by an image processing system to generate a high dynamic range image, in accordance with some examples of the present disclosure.

FIG. 5 is a flowchart illustrating an example process 500 for reducing the power and bandwidth used to generate an HDR image. At block 502, the process 500 can include obtaining, from one or more image sensors (image sensor 130), a first image (SE image 302 or SE image 402) having a first exposure time and a second image (e.g., LE image 306 or LE image 404) having a second exposure time. In some examples, the second exposure time of the second image is greater than the first exposure time. For example, in some cases, the first image can be a short exposure image and the second image can be a long exposure image.

In some examples, the one or more first pixel values of the first image correspond to a first set of pixels from an under-saturated region of the first image, and the one or more second pixel values of the second image correspond to a second set of pixels from a saturated region of the second image.

At block 504, the process 500 can include setting one or more first pixel values of the first image that are below a minimum threshold to a minimum pixel value and one or more second pixel values of the second image that are above a maximum threshold to a maximum pixel value. In some examples, setting the one or more first pixel values of the first image that are below the minimum threshold to the minimum pixel value can include determining that the one or more first pixel values are below the minimum threshold; and based on determining that the one or more first pixel values are below the minimum threshold, increasing the one or more first pixel values to the minimum pixel value. In some examples, setting the one or more second pixel values of the second image that are above the maximum threshold to the maximum pixel value can include determining that the one or more second pixel values are above the maximum threshold; and decreasing the one or more second pixel values to the maximum pixel value.

In some examples, setting the one or more first pixel values of the first image to the minimum pixel value can include determining that a first set of pixels of a region of the first image is below the minimum threshold; and based on the first set of pixels of the region of the first image being below the minimum threshold, clamping one or more pixels from the first set of pixels to the minimum pixel value. In some examples, setting the one or more second pixel values of the second image to the maximum pixel value can include determining that a second set of pixels of a region of the second image is above the maximum threshold; and based on the second set of pixels of the region of the second image being above the maximum threshold, clamping one or more pixels from the second set of pixels to the maximum pixel value.

In some cases, setting the one or more first pixel values of the first image to the minimum pixel value and the one or more second pixel values of the second image to the maximum pixel value can include clamping the one or more first pixel values to the minimum pixel value and the one or more second pixel values to the maximum pixel value.

At block 506, the process 500 can include storing, in memory (e.g., RAM 140), a compressed version of the first image with the one or more first pixel values set to the minimum pixel value and a compressed version of the second image with the one or more second pixel values set to the maximum pixel value. For example, the image processing system 100 can write to memory the compressed version of the first image including the one or more first pixel values set to the minimum pixel value, and writing to memory the compressed version of the second image including the one or more second pixel values set to the maximum pixel value.

At block 508, the process 500 can include retrieving, from the memory, the compressed version of the first image and the compressed version of the second image. For example the image processing system 100 can read the compressed versions of the first image and the second image from the memory.

At block 510, the process 500 can include generating, based on the compressed version of the first image and the compressed version of the second image, a first decompressed image including the first image with the one or more first pixel values set to the minimum pixel value and a second decompressed image including the second image with the one or more second pixel values set to the maximum pixel value.

At block 512, the process 500 can include generating a high dynamic range (HDR) image based on the first decompressed image and the second decompressed image. In some examples, generating the HDR image can include merging pixels of the first decompressed image and pixels of the second decompressed image.

In some aspects, the process 500 can include obtaining, from the one or more image sensors, a third image having a third exposure time that is greater than the first exposure time and less than the second exposure time; and storing, in the memory, a compressed version of the third image. In some aspects, the process 500 can include retrieving, from the memory, the compressed version of the third image; and generating, based on the compressed version of the third image, a third decompressed image including the third image. In some examples, generating the HDR image can include generating the HDR image based on the first decompressed image, the second decompressed image, and the third decompressed image.

In some cases, generating the HDR image based on the first decompressed image, the second decompressed image, and the third decompressed image can include merging the first decompressed image, the second decompressed image, and the third decompressed image into a single image.

In some examples, the system process 300, the system process 400, and/or the process 500 may be performed by one or more computing devices or apparatuses. In one illustrative example, the system process 300, the system process 400, and/or the process 500 can be performed by the image processing system 100 shown in FIG. 1. In some examples, the system process 300, the system process 400, and/or the process 500 can be performed by one or more computing devices with the computing system 600 shown in FIG. 6. In some cases, such a computing device or apparatus may include a processor, microprocessor, microcomputer, or other component of a device that is configured to carry out the steps of the system process 300, the system process 400, and/or the process 500. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The system process 300, the system process 400, and/or the process 500 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the system process 300, the system process 400, and/or the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 6 illustrates an example computing system 600 of an example computing device which can implement various techniques described herein. For example, the computing system 600 can implement at least some portions of the image processing system 100 shown in FIG. 1. The components of the computing system 600 are shown in electrical communication with each other using a connection 605, such as a bus. The example computing system 600 includes a processing unit (CPU or processor) 610 and a computing device connection 605 that couples various computing device components including the computing device memory 615, such as read only memory (ROM) 620 and random access memory (RAM) 625, to the processor 610.

The computing system 600 can include a cache of high-speed memory connected directly with, in close proximity to, or integrated as part of the processor 610. The computing system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general-purpose processor and a hardware or software service stored in storage device 630 and configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device. In some instances, multimodal computing devices can enable a user to provide multiple types of input to communicate with the computing system 600. The communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include software, code, firmware, etc., for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software.

Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, the apparatus comprising: a memory; and one or more processors coupled to the memory, the one or more processors being configured to: obtain, from one or more image sensors, a first image having a first exposure time and a second image having a second exposure time, wherein the second exposure time is greater than the first exposure time; set one or more first pixel values of the first image that are below a minimum threshold to a minimum pixel value and one or more second pixel values of the second image that are above a maximum threshold to a maximum pixel value; store, in the memory, a compressed version of the first image with the one or more first pixel values set to the minimum pixel value and a compressed version of the second image with the one or more second pixel values set to the maximum pixel value; retrieve, from the memory, the compressed version of the first image and the compressed version of the second image; generate, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and generate a high dynamic range (HDR) image based on the first decompressed image and the second decompressed image.

Aspect 2. The apparatus of Aspect 1, wherein, to set the one or more first pixel values of the first image that are below the minimum threshold to the minimum pixel value, the one or more processors are configured to: determine that the one or more first pixel values are below the minimum threshold; and based on determining that the one or more first pixel values are below the minimum threshold, increase the one or more first pixel values to the minimum pixel value.

Aspect 3. The apparatus of any of Aspects 1 to 2, wherein, to set the one or more second pixel values of the second image that are above the maximum threshold to the maximum pixel value, the one or more processors are configured to: determine that the one or more second pixel values are above the maximum threshold; and decrease the one or more second pixel values to the maximum pixel value.

Aspect 4. The apparatus of any of Aspects 1 to 3, wherein, to generate the HDR image, the one or more processors are configured to: merge pixels of the first decompressed image and pixels of the second decompressed image.

Aspect 5. The apparatus of any of Aspects 1 to 4, wherein the one or more processors are configured to: obtain, from the one or more image sensors, a third image having a third exposure time that is greater than the first exposure time and less than the second exposure time; and store, in the memory, a compressed version of the third image.

Aspect 6. The apparatus of Aspect 5, wherein the one or more processors are configured to: retrieve, from the memory, the compressed version of the third image; and generate, based on the compressed version of the third image, a third decompressed image comprising the third image.

Aspect 7. The apparatus of Aspect 6, wherein the one or more processors are configured to: generate the HDR image based on the first decompressed image, the second decompressed image, and the third decompressed image.

Aspect 8. The apparatus of Aspect 7, wherein, to generate the HDR image based on the first decompressed image, the second decompressed image, and the third decompressed image, the one or more processors are configured to: merge the first decompressed image, the second decompressed image, and the third decompressed image.

Aspect 9. The apparatus of any of Aspects 1 to 8, wherein the one or more first pixel values of the first image correspond to a first set of pixels from an under-saturated region of the first image, and wherein the one or more second pixel values of the second image correspond to a second set of pixels from a saturated region of the second image.

Aspect 10. The apparatus of any of Aspects 1 to 9, wherein, to set the one or more first pixel values of the first image to the minimum pixel value and the one or more second pixel values of the second image to the maximum pixel value, the one or more processors are configured to: clamp the one or more first pixel values to the minimum pixel value and the one or more second pixel values to the maximum pixel value.

Aspect 11. The apparatus of any of Aspects 1 to 10, wherein, to set the one or more first pixel values of the first image to the minimum pixel value, the one or more processors are configured to: determine that a first set of pixels of a region of the first image is below the minimum threshold; and based on the first set of pixels of the region of the first image being below the minimum threshold, clamp one or more pixels from the first set of pixels to the minimum pixel value.

Aspect 12. The apparatus of Aspect 11, wherein, to set the one or more second pixel values of the second image to the maximum pixel value, the one or more processors are configured to: determine that a second set of pixels of a region of the second image is above the maximum threshold; and based on the second set of pixels of the region of the second image being above the maximum threshold, clamp one or more pixels from the second set of pixels to the maximum pixel value.

Aspect 13. The apparatus of any of Aspects 1 to 12, wherein the apparatus comprises a camera device.

Aspect 14. The apparatus of any of Aspects 1 to 13, wherein the apparatus comprises a mobile device.

Aspect 15. A method of processing image data, the method comprising: obtaining, from one or more image sensors, a first image having a first exposure time and a second image having a second exposure time, wherein the second exposure time is greater than the first exposure time; setting one or more first pixel values of the first image that are below a minimum threshold to a minimum pixel value and one or more second pixel values of the second image that are above a maximum threshold to a maximum pixel value; storing, in memory, a compressed version of the first image with the one or more first pixel values set to the minimum pixel value and a compressed version of the second image with the one or more second pixel values set to the maximum pixel value; retrieving, from the memory, the compressed version of the first image and the compressed version of the second image; generating, based on the compressed version of the first image and the compressed version of the second image, a first decompressed image comprising the first image with the one or more first pixel values set to the minimum pixel value and a second decompressed image comprising the second image with the one or more second pixel values set to the maximum pixel value; and generating a high dynamic range (HDR) image based on the first decompressed image and the second decompressed image.

Aspect 16. The method of Aspect 15, wherein setting the one or more first pixel values of the first image that are below the minimum threshold to the minimum pixel value comprises: determining that the one or more first pixel values are below the minimum threshold; and based on determining that the one or more first pixel values are below the minimum threshold, increasing the one or more first pixel values to the minimum pixel value.

Aspect 17. The method of any of Aspects 15 to 16, wherein setting the one or more second pixel values of the second image that are above the maximum threshold to the maximum pixel value comprises: determining that the one or more second pixel values are above the maximum threshold; and decreasing the one or more second pixel values to the maximum pixel value.

Aspect 18. The method of any of Aspects 15 to 17, wherein generating the HDR image comprises: merging pixels of the first decompressed image and pixels of the second decompressed image.

Aspect 19. The method of any of Aspects 15 to 18, further comprising: obtaining, from the one or more image sensors, a third image having a third exposure time that is greater than the first exposure time and less than the second exposure time; and storing, in the memory, a compressed version of the third image.

Aspect 20. The method of Aspect 19, further comprising: retrieving, from the memory, the compressed version of the third image; and generating, based on the compressed version of the third image, a third decompressed image comprising the third image.

Aspect 21. The method of Aspect 20, further comprising: generating the HDR image based on the first decompressed image, the second decompressed image, and the third decompressed image.

Aspect 22. The method of Aspect 21, wherein generating the HDR image based on the first decompressed image, the second decompressed image, and the third decompressed image comprises: merging the first decompressed image, the second decompressed image, and the third decompressed image.

Aspect 23. The method of any of Aspects 15 to 22, wherein the one or more first pixel values of the first image correspond to a first set of pixels from an under-saturated region of the first image, and wherein the one or more second pixel values of the second image correspond to a second set of pixels from a saturated region of the second image.

Aspect 24. The method of any of Aspects 15 to 23, wherein setting the one or more first pixel values of the first image to the minimum pixel value and the one or more second pixel values of the second image to the maximum pixel value comprises: clamping the one or more first pixel values to the minimum pixel value and the one or more second pixel values to the maximum pixel value.

Aspect 25. The method of any of Aspects 15 to 24, wherein setting the one or more first pixel values of the first image to the minimum pixel value comprises: determining that a first set of pixels of a region of the first image is below the minimum threshold; and based on the first set of pixels of the region of the first image being below the minimum threshold, clamping one or more pixels from the first set of pixels to the minimum pixel value.

Aspect 26. The method of Aspect 25, wherein setting the one or more second pixel values of the second image to the maximum pixel value comprises: determining that a second set of pixels of a region of the second image is above the maximum threshold; and based on the second set of pixels of the region of the second image being above the maximum threshold, clamping one or more pixels from the second set of pixels to the maximum pixel value.

Aspect 27. A non-transitory computer-readable medium including instructions which, when executed by one or more processors, cause the one or more processors to perform operations according to any of Aspects 1 to 26.

Aspect 28. An apparatus for processing image data, the apparatus comprising one or more means for performing operations according to any of Aspects 1 to 26.

What is claimed is:

1. An apparatus for processing image data, the apparatus comprising:
    a memory; and
    one or more processors coupled to the memory, the one or more processors being configured to:
        obtain, from one or more image sensors, a first image having a first exposure time and a second image having a second exposure time, wherein the second exposure time is greater than the first exposure time;
        clamp one or more first pixel values of the first image that are below a minimum threshold to a minimum pixel value and one or more second pixel values of the second image that are above a maximum threshold to a maximum pixel value;

store, in the memory, a compressed version of the first image with the one or more first pixel values clamped to the minimum pixel value and a compressed version of the second image with the one or more second pixel values clamped to the maximum pixel value;

retrieve, from the memory, the compressed version of the first image and the compressed version of the second image;

generate, based on the compressed version of the first image and the compressed version of the second image, a first decompressed image comprising the first image with the one or more first pixel values clamped to the minimum pixel value and a second decompressed image comprising the second image with the one or more second pixel values clamped to the maximum pixel value; and generate a high dynamic range (HDR) image based on the first decompressed image and the second decompressed image.

2. The apparatus of claim 1, wherein, to clamp the one or more first pixel values of the first image that are below the minimum threshold to the minimum pixel value, the one or more processors are configured to:

determine that the one or more first pixel values are below the minimum threshold; and based on determining that the one or more first pixel values are below the minimum threshold, increase the one or more first pixel values to the minimum pixel value.

3. The apparatus of claim 1, wherein, to clamp the one or more second pixel values of the second image that are above the maximum threshold to the maximum pixel value, the one or more processors are configured to:

determine that the one or more second pixel values are above the maximum threshold; and decrease the one or more second pixel values to the maximum pixel value.

4. The apparatus of claim 1, wherein, to generate the HDR image, the one or more processors are configured to:

merge pixels of the first decompressed image and pixels of the second decompressed image.

5. The apparatus of claim 1, wherein the one or more processors are configured to:

obtain, from the one or more image sensors, a third image having a third exposure time that is greater than the first exposure time and less than the second exposure time; and store, in the memory, a compressed version of the third image.

6. The apparatus of claim 5, wherein the one or more processors are configured to:

retrieve, from the memory, the compressed version of the third image; and generate, based on the compressed version of the third image, a third decompressed image comprising the third image.

7. The apparatus of claim 6, wherein the one or more processors are configured to:

generate the HDR image based on the first decompressed image, the second decompressed image, and the third decompressed image.

8. The apparatus of claim 7, wherein, to generate the HDR image based on the first decompressed image, the second decompressed image, and the third decompressed image, the one or more processors are configured to:

merge the first decompressed image, the second decompressed image, and the third decompressed image.

9. The apparatus of claim 1, wherein the one or more first pixel values of the first image correspond to a first set of pixels from an under-saturated region of the first image, and wherein the one or more second pixel values of the second image correspond to a second set of pixels from a saturated region of the second image.

10. The apparatus of claim 1, wherein, to clamp the one or more first pixel values of the first image to the minimum pixel value, the one or more processors are configured to:

determine that a first set of pixels of a region of the first image is below the minimum threshold; and based on the first set of pixels of the region of the first image being below the minimum threshold, clamp one or more pixels from the first set of pixels to the minimum pixel value.

11. The apparatus of claim 10, wherein, to clamp the one or more second pixel values of the second image to the maximum pixel value, the one or more processors are configured to:

determine that a second set of pixels of a region of the second image is above the maximum threshold; and based on the second set of pixels of the region of the second image being above the maximum threshold, clamp one or more pixels from the second set of pixels to the maximum pixel value.

12. The apparatus of claim 1, wherein the apparatus comprises a camera device.

13. The apparatus of claim 1, wherein the apparatus comprises a mobile device.

14. A method of processing image data, the method comprising:

obtaining, from one or more image sensors, a first image having a first exposure time and a second image having a second exposure time, wherein the second exposure time is greater than the first exposure time;

clamping one or more first pixel values of the first image that are below a minimum threshold to a minimum pixel value and one or more second pixel values of the second image that are above a maximum threshold to a maximum pixel value;

storing, in memory, a compressed version of the first image with the one or more first pixel values set to the minimum pixel value and a compressed version of the second image with the one or more second pixel values clamped to the maximum pixel value;

retrieving, from the memory, the compressed version of the first image and the compressed version of the second image;

generating, based on the compressed version of the first image and the compressed version of the second image, a first decompressed image comprising the first image with the one or more first pixel values clamped to the minimum pixel value and a second decompressed image comprising the second image with the one or more second pixel values clamped to the maximum pixel value; and generating a high dynamic range (HDR) image based on the first decompressed image and the second decompressed image.

15. The method of claim 14, wherein clamping the one or more first pixel values of the first image that are below the minimum threshold to the minimum pixel value comprises:

determining that the one or more first pixel values are below the minimum threshold; and based on determining that the one or more first pixel values are below the minimum threshold, increasing the one or more first pixel values to the minimum pixel value.

16. The method of claim 14, wherein clamping the one or more second pixel values of the second image that are above the maximum threshold to the maximum pixel value comprises:

determining that the one or more second pixel values are above the maximum threshold; and decreasing the one or more second pixel values to the maximum pixel value.

17. The method of claim 14, wherein generating the HDR image comprises:

merging pixels of the first decompressed image and pixels of the second decompressed image.

18. The method of claim 14, further comprising:

obtaining, from the one or more image sensors, a third image having a third exposure time that is greater than the first exposure time and less than the second exposure time; and storing, in the memory, a compressed version of the third image.

19. The method of claim 18, further comprising:

retrieving, from the memory, the compressed version of the third image; and generating, based on the compressed version of the third image, a third decompressed image comprising the third image.

20. The method of claim 19, further comprising:

generating the HDR image based on the first decompressed image, the second decompressed image, and the third decompressed image.

21. The method of claim 20, wherein generating the HDR image based on the first decompressed image, the second decompressed image, and the third decompressed image comprises:

merging the first decompressed image, the second decompressed image, and the third decompressed image.

22. The method of claim 14, wherein the one or more first pixel values of the first image correspond to a first set of pixels from an under-saturated region of the first image, and wherein the one or more second pixel values of the second image correspond to a second set of pixels from a saturated region of the second image.

23. The method of claim 14, wherein clamping the one or more first pixel values of the first image to the minimum pixel value comprises:

determining that a first set of pixels of a region of the first image is below the minimum threshold; and based on the first set of pixels of the region of the first image being below the minimum threshold, clamping one or more pixels from the first set of pixels to the minimum pixel value.

24. The method of claim 23, wherein clamping the one or more second pixel values of the second image to the maximum pixel value comprises:

determining that a second set of pixels of a region of the second image is above the maximum threshold; and based on the second set of pixels of the region of the second image being above the maximum threshold, clamping one or more pixels from the second set of pixels to the maximum pixel value.

25. A non-transitory computer-readable medium including instructions which, when executed by one or more processors, cause the one or more processors to:

obtain, from one or more image sensors, a first image having a first exposure time and a second image having a second exposure time, wherein the second exposure time is greater than the first exposure time;

clamp one or more first pixel values of the first image that are below a minimum threshold to a minimum pixel value and one or more second pixel values of the second image that are above a maximum threshold to a maximum pixel value;

store, in memory, a compressed version of the first image with the one or more first pixel values set to the minimum pixel value and a compressed version of the second image with the one or more second pixel values clamped to the maximum pixel value;

retrieve, from the memory, the compressed version of the first image and the compressed version of the second image;

generate, based on the compressed version of the first image and the compressed version of the second image, a first decompressed image comprising the first image with the one or more first pixel values clamped to the minimum pixel value and a second decompressed image comprising the second image with the one or more second pixel values clamped to the maximum pixel value; and generate a high dynamic range (HDR) image based on the first decompressed image and the second decompressed image.

26. The non-transitory computer-readable medium of claim 25, wherein, to clamp the one or more first pixel values of the first image that are below the minimum threshold to the minimum pixel value, the instructions, when executed by the one or more processors, cause the one or more processors to:

determine that the one or more first pixel values are below the minimum threshold; and based on determining that the one or more first pixel values are below the minimum threshold, increase the one or more first pixel values to the minimum pixel value.

27. The non-transitory computer-readable medium of claim 25, wherein, to clamp the one or more second pixel values of the second image that are above the maximum threshold to the maximum pixel value, the instructions, when executed by the one or more processors, cause the one or more processors to:

determine that the one or more second pixel values are above the maximum threshold; and decrease the one or more second pixel values to the maximum pixel value.

28. The non-transitory computer-readable medium of claim 25, wherein, to generate the HDR image, the instructions, when executed by the one or more processors, cause the one or more processors to:

merge pixels of the first decompressed image and pixels of the second decompressed image.

29. The non-transitory computer-readable medium of claim 25, wherein the instructions, when executed by the one or more processors, cause the one or more processors to:

obtain, from the one or more image sensors, a third image having a third exposure time that is greater than the first exposure time and less than the second exposure time; and store, in the memory, a compressed version of the third image.

30. The non-transitory computer-readable medium of claim 25, wherein the one or more first pixel values of the first image correspond to a first set of pixels from an under-saturated region of the first image, and wherein the one or more second pixel values of the second image correspond to a second set of pixels from a saturated region of the second image.

\* \* \* \* \*